Oct. 2, 1928.
J. C. McCUNE
1,685,856
VARIABLE LOAD DEVICE
Filed Oct. 14, 1927
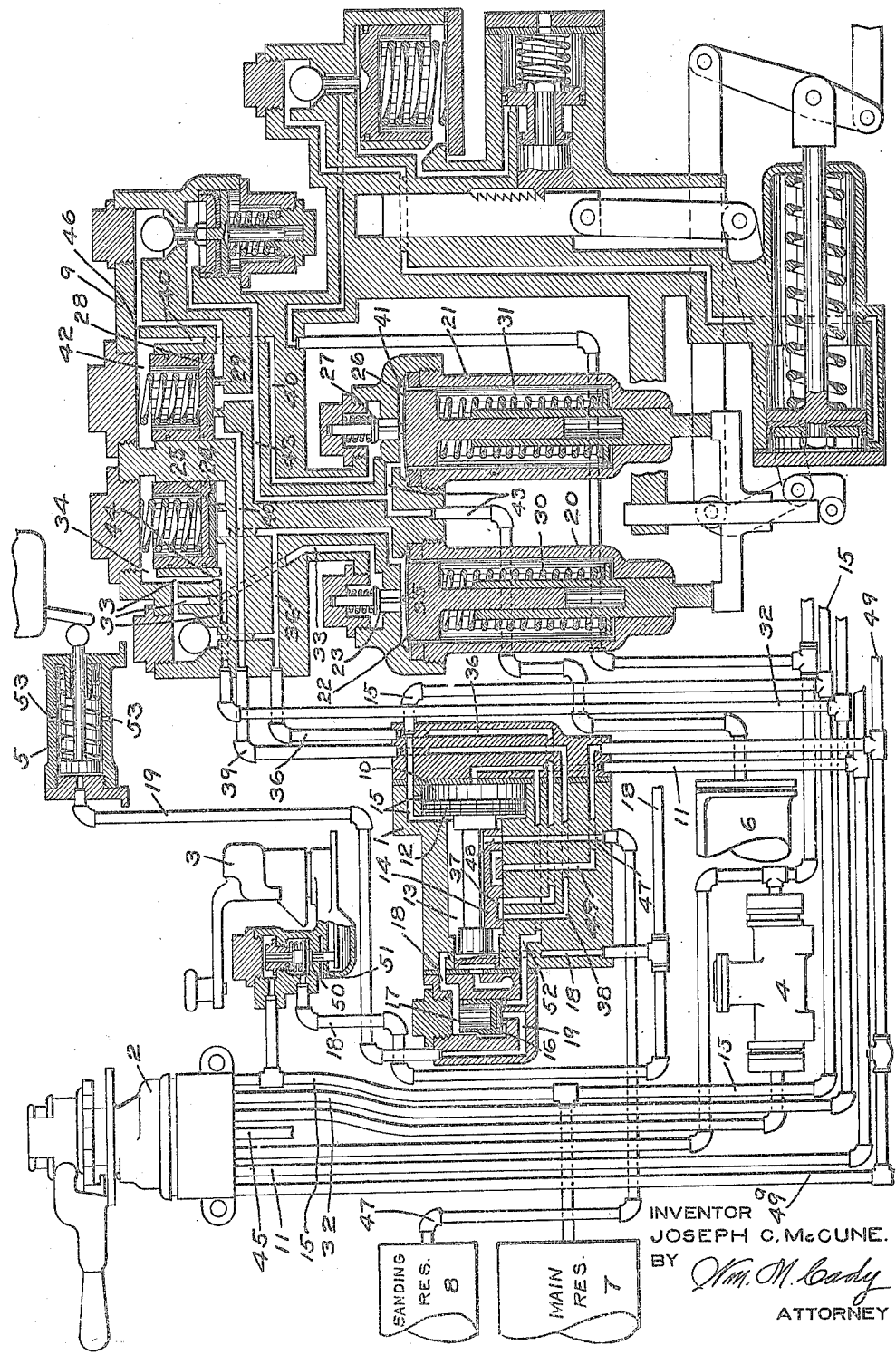
INVENTOR
JOSEPH C. McCUNE.
BY
Wm. M. Cady
ATTORNEY Patented Oct. 2, 1928.

1,685,856

UNITED STATES PATENT OFFICE.

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

VARIABLE-LOAD DEVICE.

Application filed October 14, 1927. Serial No. 226,121.

This invention relates to fluid pressure brakes, and more particularly to a brake equipment of the type known as the "safety car control equipment."

An object of my invention is to provide a "safety car control equipment" with means for varying the braking power according to the load on the car, and to so arrange said means, that the parts of the usual "safety car control equipment" are utilized without alteration, to control the means for varying the braking power.

Another object of my invention is to associate a variable load mechanism with the usual "safety car control equipment" in such a manner that portions of said equipment will function to control the variable load mechanism, without the intervention of any other controlling means.

Other objects and advantages of the invention will appear from the following more detailed description.

In the accompanying drawing, the single figure illustrates, in diagrammatic form, a fluid pressure brake of the "safety car control" type embodying the invention.

A "safety car control equipment" of the usual type is shown in the drawing, comprising in general an emergency valve device 1, a brake valve device 2, a safety car controller handle device 3, a door engine 4, a circuit breaker cylinder device 5, a brake cylinder 6, a main reservoir 7, and a sanding reservoir 8. According to my invention, there is associated with this "safety car control equipment," a variable load brake mechanism 9.

The emergency valve device 1 comprises a casing having a piston chamber 10 connected to an emergency brake pipe 11 and containing a piston 12. This device also has a valve chamber 13 containing a slide valve 14 adapted to be operated by the piston 12. The chambers 10 and 13 are connected with the main reservoir 7 through the pipe and passages 15. A relay valve piston 16 is associated with the emergency valve device and has the piston chamber 17, at one side, connected through a passage and pipe 18, with the safety car controller handle device 3. The other side of this relay valve is connected to the circuit breaker cylinder device 5, by a passage and pipe 19.

The variable load mechanism 9 may be, in many respects, of the character shown in United States Letters Patent No. 1,505,950, of Clyde C. Farmer, dated August 26, 1924, and is for the purpose of automatically regulating the brake cylinder pressure in either a service or an emergency application of the brakes as the load on the car is increased or decreased. In the present embodiment of the invention, this variable load mechanism 9 has been illustrated as comprising a casing with which there is associated a service brake cylinder pressure limiting valve device 20 and an emergency brake cylinder pressure limiting device 21. The valve device 20 comprises a flexible diaphragm 22 adapted to operate a valve 23 which controls the operation of a service brake cylinder supply valve 24 normally seating on a seat ring 25. The valve device 21 is similar to the valve device 20 and comprises a flexible diaphragm 26 for operating a valve 27 which controls the operation of an emergency brake cylinder supply valve 28 normally seating on a seat ring 29. The diaphragms 22 and 26, on one side, are subject to the pressures of adjustable coil springs 30 and 31 respectively, and on the other side, are subject to brake cylinder pressure as hereinafter more fully described. The springs 30 and 31 are automatically adjusted in accordance with the weight of the car and the load carried thereby, through the medium of a mechanism substantially the same as that described in the hereinbefore mentioned patent and for this reason a detailed description of the mechanism is deemed unnecessary.

When the brake valve 2 is operated to effect a service application of the brakes, the main reservoir pipe 15 is connected, through the brake valve, with a straight air pipe 32, which is connected to a passage 33 leading to the outer exposed seated area of the valve 24, and to a chamber 34, on one side of the valve 24, as well as leading to a chamber 35, on one side of the diaphragm 22, the valve 23 being interposed in the passage between the chambers 34 and 35. The chamber 34 is connected to the emergency slide valve seat by passages and pipe 36, one of which passages leads to the inner seated area of the supply valve 24. The slide valve 14 has a cavity 37 which connects the passage 36, of the emergency valve device 1, to a passage 38 of the valve device 1, which latter passage is connected, by a pipe 39, to a passage 40, in the casing of the variable load mechanism, leading to the outer exposed seated area of the supply valve 28 and to a chamber 41 on one side of the diaphragm 26, and also to a chamber 42 on one side of the valve 28. The chamber 41 is connected to the brake cylinder 6 by a passage and pipe 43, such passage also leading to the inner seated area of the supply valve 28.

When a service application is effected, fluid under pressure from the main reservoir, supplied to the passage 33, acts upon the exposed outer seated area of the valve piston 24, causing it to unseat and permit the flow of fluid to passage 36, cavity 37 in the emergency slide valve 14, passage 38, pipe 39, and passage 40. Fluid supplied to passage 40 acts upon the exposed outer seated area of the valve piston 28, causing it to unseat and supply fluid under pressure to the brake cylinder 6 through passage and pipe 43. Fluid under pressure supplied to the brake cylinder 6 is also supplied to the valve piston chamber 34 and to the diaphragm chamber 35 through a restriction 44 in one of the passages 33, so that, when the pressure in the brake cylinder has been increased to a predetermined degree, corresponding to the adjustment of the spring 30 in accordance with the load on the car, the diaphragm 22 will be caused to move a distance sufficient to permit the valve 23 to close. Any further increase in the pressure of fluid in the passages 33 and chamber 34 now acts upon the spring side of the valve piston 24 and causes it to seat on the seat ring 25, thereby cutting off the further supply of fluid to the brake cylinder.

When it is desired to effect an emergency application of the brakes, the brake valve 2 is moved to its emergency position, which causes the emergency pipe 11 and piston chamber 10, of the emergency valve device 1, to be vented to the atmosphere through an exhaust pipe 45, so that, fluid under pressure in the chamber 13 of the emergency valve device will cause the piston 12 to shift the emergency slide valve 14 to its emergency position, in which the passage 38 will be uncovered and fluid at main reservoir pressure in the piston chamber 13 of the emergency valve device 1 will flow through this passage 38, pipe 39 and passage 40, and the pressure of the fluid thus supplied to this latter passage acts upon the exposed outer seated area of the valve piston 28, causing it to unseat and supply fluid under main reservoir pressure to the brake cylinder 6 through passage and pipe 43. Fluid at main reservoir pressure thus supplied to the brake cylinder 6 is also supplied to the valve piston chamber 42 and to the diaphragm chamber 41 through a restriction 46 in one of the passages 40, so that, when the pressure in the brake cylinder has been increased to a predetermined degree, corresponding to the adjustment of the spring 31 in accordance with the load on the car, the diaphragm 26 will be caused to move a distance sufficient to permit the valve 27 to close. Any further increase in the pressure of fluid in the passage 40 and chamber 42 will act upon the spring side of the valve piston 28 and cause it to seat on the seat ring 29, thereby cutting off the further supply of fluid to the brake cylinder.

The sanding reservoir 8 is connected to the emergency slide valve seat by a pipe and passage 47, which when the slide valve 14 is in its normal release position, as shown in the drawing, is connected to the valve chamber 13 through a port 48 in the slide valve, thus charging the sanding reservoir with fluid at main reservoir pressure. When the piston 12 and slide valve 14 move in effecting an emergency application of the brakes, a cavity in the slide valve connects the passage 47 to a passage 49 leading to a sand pipe 49ª, which sand pipe may be provided with the usual sand traps (not shown).

The safety car controller handle device comprises a double seating valve 50, which is movable by the controller handle of the device to effect a connection between the main reservoir pipe 15 and the pipe 18, or to vent the pipe 18 to the atmosphere. Should the operator remove his hand from the controller handle of this device, the valve 50 will be moved upwardly and will permit the fluid under pressure in the chamber 17 on one side of the valve piston 16, of the emergency valve device 1, to exhaust to the atmosphere through passage and pipe 18 and an atmospheric port 51 in the casing of the device 3. Fluid under pressure acting on the outer seated area of valve piston 16, as supplied thereto from the emergency pipe 11 and passage 52 in the emergency valve device, will now cause the valve piston 16 to move to its open position, permitting fluid under pressure to flow from passage 52 and emergency pipe 11 through the passage and pipe 19 to the circuit breaker cylinder device 5, causing the piston thereof to be operated to open the power circuit in the usual manner. When this piston has moved a predetermined distance, apertures 53, in the cylinder of the device, will be uncovered and fluid under pressure from the piston chamber 10, of the emergency valve device, will exhaust therethrough to the atmosphere. This results in the piston 12 and slide valve 14, of the emergency valve device, moving to their emergency positions, after which the operations of the several parts of the apparatus are the same as hereinbefore described in connection with the effecting of an emergency application of the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a "safety car control equipment," of a variable load mechanism associated therewith, and means included in said equipment for controlling the flow of fluid under pressure to said mechanism.

2. The combination with a "safety car control equipment," of a variable load mechanism associated therewith, and an emergency valve device included in said equipment for controlling the flow of fluid under pressure to said mechanism.

3. The combination with a "safety car control equipment," of a variable load mechanism associated with said equipment and operative by fluid under pressure, when effecting an application of the brake, to vary the braking power in accordance with the load on the car, and valve means forming part of said equipment adapted to supply fluid under pressure directly to said variable load mechanism in effecting an emergency application of the brake.

4. The combination with a "safety car control equipment," of a variable load mechanism associated with said equipment and operative by fluid under pressure, when effecting an application of the brake, to vary the braking power in accordance with the load on the car, said mechanism comprising a service limiting portion and an emergency limiting portion, a brake cylinder forming a part of said equipment and connected to said emergency limiting portion, means included in said equipment for supplying fluid under pressure directly to said service limiting portion in effecting a service application of the brake, and valve means forming part of said equipment adapted to control the flow of fluid under pressure from said service limiting portion to said brake cylinder through said emergency limiting portion.

5. The combination with a "safety car control equipment," of means associated therewith and operative by fluid under pressure when effecting an emergency application of the brake to vary the braking power in accordance with the load on the car, and an emergency valve device forming part of said equipment operative to supply fluid under pressure directly to said means.

6. In a fluid pressure brake, the combination with a variable load mechanism comprising a service limiting portion and an emergency limiting portion, of a brake cylinder connected to said emergency limiting portion, means operative for supplying fluid under pressure to said service limiting portion, and means for controlling the supply of fluid under pressure from said service limiting portion to said brake cylinder through said emergency limiting portion.

7. In a fluid pressure brake, the combination with a variable load mechanism comprising a service limiting portion and an emergency limiting portion, of a brake cylinder connected to said emergency limiting portion, means operative for supplying fluid under pressure to said service limiting portion, and an emergency valve device for controlling the supply of fluid under pressure from said service limiting portion to said brake cylinder through said emergency limiting portion when a service application of the brake is effected and for supplying fluid under pressure to said brake cylinder through said emergency limiting portion only, when an emergency application of the brake is effected.

8. In a fluid pressure brake, the combination with a brake cylinder, of a variable load mechanism comprising a service limiting portion adapted to limit the supply of fluid under pressure to said brake cylinder according to the load on the car, and an emergency limiting portion adapted to limit the supply of fluid under pressure to said brake cylinder according to the load on the car, said brake cylinder connected through said emergency limiting portion only, and means whereby fluid under pressure is supplied to said brake cylinder through both of said portions when a service application of the brake is effected and through said emergency limiting portion only, when an emergency application of the brake is effected.

9. In a fluid pressure brake, the combination with a variable load mechanism having a service limiting portion and an emergency limiting portion, of a brake cylinder connected to said emergency limiting portion and adapted to be supplied with fluid under pressure through both of said limiting portions when a service application of the brake is effected and through the emergency limiting portion only, when an emergency application of the brake is effected.

In testimony whereof I have hereunto set my hand.

JOSEPH C. McCUNE.